United States Patent

Kuhlthau

[11] 4,000,141
[45] Dec. 28, 1976

[54] SUBSTITUTED TETRAHYDRO QUINOLINE CATIONIC DYESTUFFS

[75] Inventor: Hans Peter Kuhlthau, Leverkusen, Germany

[73] Assignee: Bayer Aktiengesellschaft, Leverkusen, Germany

[22] Filed: Oct. 11, 1974

[21] Appl. No.: 514,250

[30] Foreign Application Priority Data

Oct. 12, 1973 Germany .......................... 2351296

[52] U.S. Cl. ............... 260/286 R; 260/283 CN; 260/286 Q; 260/288 CE; 260/287 T; 8/1 D
[51] Int. Cl.² ......................................... C07D 401/04
[58] Field of Search ....... 260/286 R, 283 R, 287 T, 260/283 CN, 289 R, 289 CE, 288 CE

[56] References Cited

UNITED STATES PATENTS

| | | | |
|---|---|---|---|
| 2,646,430 | 7/1953 | Brooker et al. | 260/240.6 |
| 3,278,551 | 10/1966 | Kleiner et al. | 260/326.5 |
| 3,347,865 | 10/1967 | Brack et al. | 260/313.1 |
| 3,769,297 | 10/1973 | Brack et al. | 260/315. |

Primary Examiner—Nicholas S. Rizzo
Assistant Examiner—David E. Wheeler
Attorney, Agent, or Firm—Plumley and Tyner

[57] ABSTRACT

Cationic dyestuffs of the formula

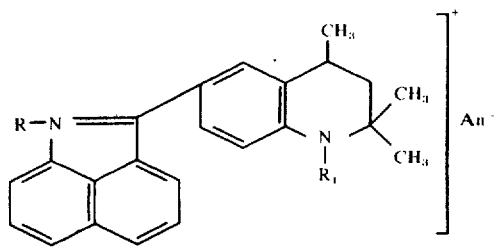

in which
R represents alkyl, alkenyl, alkinyl, cycloalkyl, aralkyl or aryl,
$R_1$ represents hydrogen or an alkyl, alkenyl, alkinyl, cycloalkyl or aralkyl radical and
$An^-$ represents an anion, processes for their preparation and their use for dyeing, printing and bulk dyeing of natural and synthetic materials.

9 Claims, No Drawings

SUBSTITUTED TETRAHYDRO QUINOLINE CATIONIC DYESTUFFS

The invention relates to new cationic dyestuffs of the general formula

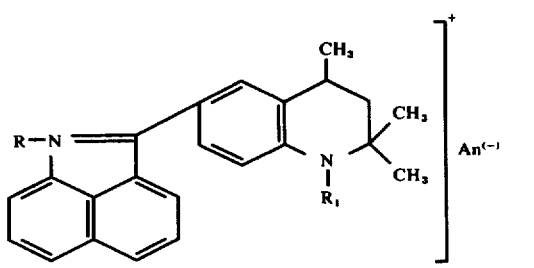

in which
R represents an alkyl, alkenyl, alkinyl, cycloalkyl, aralkyl or aryl radical or an alkylene radical bonded to the naphthalene ring in the β-position,
$R_1$ represents hydrogen or an alkyl, alkenyl, alkinyl, cycloalkyl or aralkyl radical and
An$^{(-)}$ represents an anion
and in which the cyclic and acyclic radicals can contain non-ionic substituents and in which other, optionally non-ionically substituted carbocyclic or heterocyclic rings can be fused with the rings; it also relates to processes for the preparation of these dyestuffs and to their use for dyeing, printing and bulk dyeing of natural and synthetic materials.

Preferred dyestuffs of the formula I are those which correspond to the formula

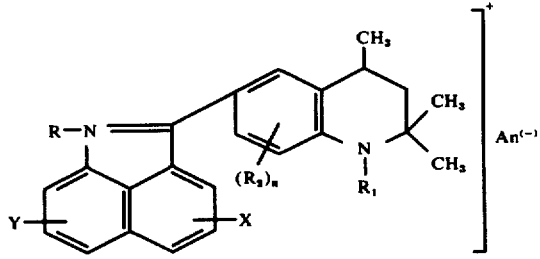

in which
R, $R_1$ and An$^{(-)}$ have the meaning indicated under formula I and
$R_2$ represents hydrogen, halogen or an alkyl, alkenyl, alkinyl, aralkyl, alkoxy, aralkoxy, hydroxyl, amino or acylamino radical,
n represents an integer from 1 to 3,
X represents hydrogen, halogen, or a hydroxyl, alkoxy, alkyl, alkenyl, alkinyl, amino, acylamino, aminosulphonyl, nitrile, aminocarbonyl or alkoxycarbonyl group, and
Y represents hydrogen, halogen, or a hydroxyl, alkoxy, alkyl, alkenyl, alkinyl, amino, acylamino, aminosulphonyl, nitrile, aminocarbonyl, alkoxycarbonyl,
alkylsulphonyl, arylsulphonyl or sulphamidine group
and in which
the radicals R, $R_1$, $R_2$, X and Y can contain non-ionic substituents.

Particularly preferred dyestuffs of the formula I are those which correspond to the formula

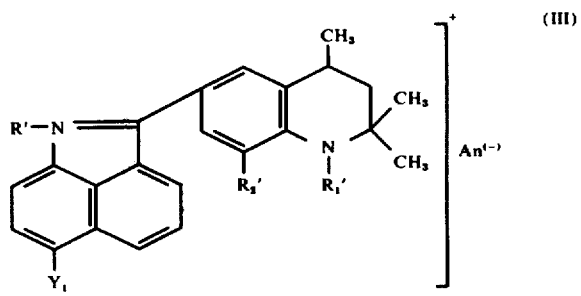

in which
R' represents an alkyl radical with 1-6 C atoms or an alkenyl radical with 2-6 C atoms,
$R_1'$ represents an alkyl radical with 1-6 C atoms, an alkenyl radical with 2-6 C atoms, a benzyl radical, a cyclohexyl radical or, especially, hydrogen,
$R_2'$ represents hydrogen or an alkyl or alkoxy radical with 1 to 4 C atoms,
$Y_1$ represents hydrogen, chlorine or bromine and
An$^{(-)}$ represents an anion
and in which
the radicals R', $R_1'$ and $R_2'$ can be substituted by non-ionic atoms or groups.

Amongst the dyestuffs of the formula III, dyestuffs to be singled out particularly are those in which
R' represents a methyl, ethyl, n-propyl, n-butyl, β-cyanoethyl or β-chloroethyl group;
$R_1'$ represents methyl, ethyl, n- or iso-propyl, n- or iso-butyl, n- or iso-amyl, β-chloroethyl, β-chloropropyl, β, γ-dichloropropyl, β-hydroxycarbonylethyl, β-amidocarbonylethyl, β-cyanoethyl, β-methanoxyethyl, β-phenoxyethyl, β-benzyloxyethyl, β-acetoxyethyl, benzyl, 4-chlorobenzyl, β-(4-chlorophenoxy)-ethyl, β-(4-methylphenoxy)-ethyl, 4-methylbenzyl, β-(4-methoxyphenoxy)-ethyl or 4-methoxybenzyl; and $R_2'$ represents hydrogen, methyl, ethyl, methoxy or ethoxy.

The following may be mentioned as examples of the radicals mentioned in the definitions of R, $R_1$ and $R_2$: $C_1$-$C_6$-alkyl radicals which optionally contain non-ionic substituents, such as halogen, hydrogen, $C_1$-$C_4$-alkoxy, cyan, $C_1$-$C_4$-alkoxycarbonyl or carbonamid, e.g. the trifluoromethyl, chloroethyl, bromoethyl, hydroxyethyl, methoxymethyl, cyanoethyl, acetoxyethyl, aminocarbonylethyl, carboxyethyl, γ-cyanopropyl, β-hydroxy-n-propyl, β-hydroxy-n-butyl, β-hydroxy-i-butyl, β-hydroxy-γ-allyloxy-n-propyl and γ-methoxycarbonyl-n-butyl radical.

As alkenyl radicals, $C_2$-$C_7$-alkenyl radicals should be mentioned above all, which optionally contain non-ionic substituents such as halogen.

As alkinyl radicals, the propargyl radical should be mentioned in particular

As aralkyl radicals, the phenylmethyl, phenylethyl, β-phenyl-β-hydroxy-ethyl, 2-phenylpropyl-(2) radicals, and their derivatives substituted in the phenyl nucleus by non-ionic groups such as halogen, $C_1$-$C_6$-alkyl or $C_1$-$C_6$-alkoxy should be mentioned.

As cycloalkyl radicals, cyclopentyl and the cyclohexyl radical, which optionally contain non-ionic substituents such as $C_1$-$C_6$-alkyl, should be mentioned in particular.

Possible aryl radicals are preferably the phenyl and naphthyl radical and their derivatives substituted by non-ionic groups, such as halogen, $C_1$-$C_6$-alkyl or $C_1$-$C_6$-alkoxy, e.g. 4-methyl-phenyl, 2-methyl-phenyl, 4-chlorophenyl, 2-chlorophenyl and 2-methyl-4-chlorophenyl.

Possible radicals X are especially halogen or $C_1$-$C_6$-alkyl.

Possible radicalsl Y are especially halogen, $C_1$-$C_6$-alkyl, hydroxy, cyan, $C_1$-$C_4$-alkoxy, $C_1$-$C_4$-alkylmercapto, $C_1$-$C_4$-alkylsulfonyl, $C_1$-$C_4$-alkylcarbonylamino, mono- or di-$C_1$-$C_4$-alkylamino, aminosulfonyl, mono- or di-$C_1$-$C_4$-alkylaminosulfonyl or mono- or di-$C_1$-$C_4$-alkyl-sulfamidin.

Non-ionic substituents in the sense of the present invention are substituents which are customary in dyestuff chemistry and do not dissociate under the reaction conditions in question, such as halogen, for example fluorine, chlorine or bromine; alkyl; alkenyl especially with 2-6 C-atoms; aralkyl; aryl; alkoxy; cycloalkoxy; aralkoxy; aryloxy; aryloxyloxyalkoxy, alkylthio, aralkylthio, arylthio; nitro; nitrile; alkoxycarbonyl, formyl; alkylcarbonyl, arylcarbonyl, arylcarbonyloxy, alkylcarbonyloxy, aralkylcarbonyl, alkoxycarbonyloxy, alylcarbonylamino, arylcarbonylamino, arylaminocarbonyloxy, alkylaminocarbonyloxy, alkylsulphonylamino; arylsulphonylamino, ureido, N-arylureido, N-alkylureido, aryloxycarbonylamino, alkoxycarbonylamino, carbamoyl, N-alkylcarbamoyl, N,N-dialkylcarbamoyl, N-alkyl-N-aryl-carbamoyl, sulphamoyl, N-alkylsulphamoyl N,N-dialkyl-sulphamoyl, alkylsulphonyl, alkenylsulphonyl, aralkylsulphonyl, arylsulphonyl, aryloxcarbonyl, alkoxysulphonyl and aryloxysulphonyl; alkyl radicals mentioned contain preferably 1-4 C-atoms; aryl radicals are preferably phenyl or naphthyl, and cycloalkyl radicals mentioned are preferably cyclopentyl or cyclohexyl.

Possible anionic radicals $An^-$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoroborate, as well as anions of esters of boric acid, such as of the glycerol ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsuplphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethyl-glycollic acid, thioglycollic acid, glyceric acid, malic acid, dodecyl-tetraethylene glycolether-propionic acid, 3-nonyloxy-propionic acid, 3-isotridecyloxy-propionic acid, 3-isotridecyloxy-diethylene glycolether-propionic acid, the ether-propionic acid of the alcohol mixture with 6 to 10 carbon atoms, thioacetic acid, 6-benzoylamino-2-chlorocaproic acid, nonylphenol-tetraethylene glycolether-propionic acid, nonylphenol-diethylene glycol-etherpropionic acid, dodecyl-tetraethylene glycol-ether-propionic acid, phenoxyacetic acid, nonylphenoxyacetic acid, n-valeric acid, i-valerio acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-α, α'-dicarboxylic acid, methylene-bis-thioglycollic acid, dimethyl sulphide-α,α-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{15}$ paraffin-sulphonic acids, obtained by hydrolysis of the sulphochlorination products of the corresponding n-paraffins.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4tert.-butylbenzoic acid, 2bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid 2-hydroxybenzoic acid, 3-hydroxybenzoic acid, 4-hydroxybenzoic -hydroxyphthalic 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid -mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalene- -sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents, or at least do not influence it adversely, are preferred.

The anion is in general decided by the preparation process and by the purification of the crude dyestuff which may be carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner.

The dyestuffss of the general formula (I) are obtainable according to various processes.

Process A):

By condensation of compounds of the formula

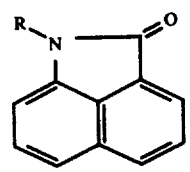

(IV)

in which

R has the meaning indicated under the formula (I) and in which

R and/or the naphthalene ring can contain non-ionic substituents, with a tetrahydroquinoline of the formula

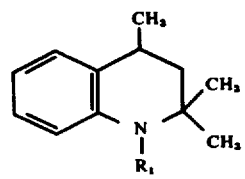

(V)

in which $R_1$ has the meaning indicated under the formula I and wherein $R_1$ and the aromatic ring can contain non-ionic substituents, in a manner which is in itself known, in the presence of condensation agents, or mixtures of condensation agents, which provide an anion $An^{(-)}$.

Examples of suitable condensation agents are phosphorus oxychloride, phosphorus trichloride, phosphorus pentachloride, tin tetrachloride, titanium tetrachloride and phosgene, with or without addition of aluminium chloride, phosphorus pentoxide, zinc chloride and boron fluoride. The condensation can optionally be carried out in diluents which are inert under the reaction conditions, such as chlorobenzene and dichlorobenzene, toluene and xylene, at temperatures between 50° and 150° C.

Instead of the naphtholactam-(1,8) of the formula (IV) it is also possible to employ a functionally equivalent compound, for example a compound of the formula VI, VII or VIII

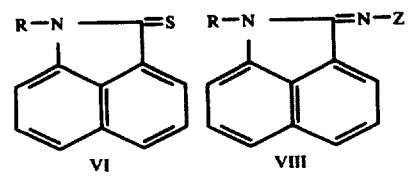

or

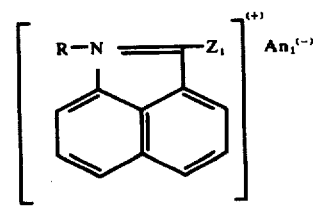

In the formulae VI, VII and VIII

R has the meaning indicated under formula I, Z is any desired radical, for example aryl, $Z_1$ is a radical which can be split off as an anion, for example an alkylmercapto group or a chlorine atom and $An_1^{(-)}$ is an anion.

A variant for the preparation of dyestuffs of the formula 1 in which $R_1$ denotes hydrogen is to employ, instead of the tetrahydroquinoline of the formula V, a compound which under the condensation conditions can be converted into such a tetrahydroquinoline (with $R_1 = H$), or can form a dyestuff, which can subsequently be converted into a dyestuff of the formula (I). Examples of such compounds are acyl derivatives of the tetrahydroquinolines (V), which react with hydrolytic elimination of the acyl radical, or derivatives of the tetrahydroquinolines (V) which contain, on the nitrogen atom, protective groups which are removable by some other method which is in itself known, for example the protective groups known from the synthesis of peptides.

Process B):

By alkylation of compounds of the formula

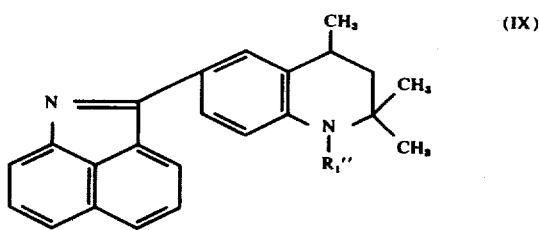

(IX)

in which $R_1''$ has the meaning indicated for $R_1$ under formula (I)

or represents an acyl radical and in which the cyclic and acyclic radicals can contain non-ionic substituents and in which other, optionally non-ionically substituted, carbocyclic or heterocyclic rings can be fused with the rings, by means of customary alkylating agents, for example alkyl halides, such as methyl iodide or ethyl bromide, α-bromo-propionitrile, β-dimethylaminoethyl chloride or β-chloroethyl methyl ether; alkenyl halides, such as allyl bromide; alkinyl halides, such as propargyl bromide; cycloalkyl halides, such as cyclohexyl bromide; aralkyl halides, such as benzyl chloride or 4-methylbenzyl bromide; alkyl sulphates, such as dimethyl sulphate or diethyl sulphate; arylsulphonic acid alkyl esters, such as toluenesulphonic acid methyl ester, ethyl ester, n-propyl ester, β-chloroethyl ester or β-cyanoethyl ester; α,β-unsaturated carboxylic acid esters, amides or nitriles, such as acrylic acid methyl ester, methacrylic acid ethyl ester, acrylonitrile or methacrylonitrile, in a solvent which is inert under the reaction conditions, such as benzene, toluene, xylene, chlorobenzene or dichlorobenzene, nitrobenzene, dioxane, chloroform, dimethylformamide and N-methylpyrrolidone, and — if a N-acyl compound ($R_1''$ = acyl) was used as the starting compound — hydrolytic elimination of the acyl radical.

Examples of suitable starting materials of the formula (IV) are: N-methylnaphtholactam-(1,8), N-ethylnaphtholactam-(1,8), N-iso-propylnaphtholactam-(1,8), N-n-propylnaphtholactam-(1,8), N-iso-butylnaphtholactam-(1,8), N-n-butylnaphtholactam-(1,8), N-iso-amylnaphtholactam-(1,8), N-n-hexylnaphtholactam-(1,8),N-cyclohexyl-naphtholactam-(1,8), N-2-trimethylenenaphtholactam-(1,8), N-benzylnaphtholactam-(1,8), N-β-phenyl-ethyl-naphtholactam-(1,8), N-γ-phenylpropylnaphtholactam-(1,8), N-phenylnaphtholactam-(1,8), N-4'-methylphenylnaphtholactam-(1,8), N-4'-methylbenzylnaphtholactam-(1,8), N-β-cyanoethylnaphtholactam-(1,8), N-β-chloroethylnaphtholactam-(1,8), N-β-methoxyethyl-naphtholactam-(1,8), N-β-hydroxycarbonylethylnaphtholactam-(1,8), N-ethoxycarbonylmethylnaphtholactam-(1,8) and N-allylnaphtholactam-(1,8), their monochloro and monobromo derivatives substituted in the naphthalene ring in the p-position to the nitrogen, 4-methoxy-, 4-ethoxy-, 4-hydroxy-, 4-acetylamino-, 4-dimethylamino-, 4-methylsulphonyl-, 4-phenylsulphonyl-, 4-methylsulphonylamino-, 4-aminosulphonyl-, 4-dimethylaminosulphonyl-, 4-cyano and 4-methylmercapto-N-ethyl-naphtholactam-(1,8), 4,5-dichloro-N-methylnaphtholactam-(1,8), 2,4-dibromo-N-ethyl- and N-n-butylnaphtholactam-(1,8), 6-methyl-amino-N-methyl-naphtholactam-(1,8) and 2-ethyl-N-methyl-naphtholactam-(1,8), N-ethylnaphtholactam-(1,8)-4-N,N-dimethyl-sulphamidine and N-ethylnaphtholactam-(1,8)-4-N-phenyl-N-methylsulphamidine.

Examples of suitable tetrahydroquinolines of the formula V are: 2,2,4-trimethyltetrahydroquinoline, N-methyl-2,2,4-trimethyl-tetrahydroquinoline, N-ethyl-2,2,4-trimethyl-tetrahydroquinoline, N-i-propyl-2,2,4-trimethyl-tetrahydroquinoline, N-n-propyl-2,2,4-trimethyl-tetrahydroquinoline, N-i-butyl-2,2,4-trimethyl-tetrahydroquinoline, N-n-butyl-2,2,4-trimethyl-tetrahydroquinoline, N-t-butyl-2,2,4-trimethyltetrahydroquinoline, N-i-amyl-2,2,4-trimethyl-tetrahydroquinoline, N-n-amyl-2,2,4-trimethyl-tetrahydroquinoline, N-n-hexyl-2,2,4-trimethyl-tetrahydroquinoline, N-allyl-2,2,4-trimethyl-tetrahydroquinoline, N-benzyl-2,2,4-trimethyl-tetrahydroquinoline, N-2'-chloro-benzyl-2,2,4-trimethyl-tetrahydroquinoline, N-4'-chloro-benzyl-2,2,4-trimethyl-tetrahydroquinoline, N-4'-methyl-benzyl-2,2,4-trimethyl-tetrahydroquinoline, N-2'-methyl-benzyl-2,2,4-trimethyl-tetrahydroquinoline, N-4'-methoxy-benzyl-2,2,4-trimethyl-tetrahydroquinoline, N-4'-ethoxy-benzyl-2,2,4-trimethyl-tetrahydroquinoline, N-β-phenylethyl-2,2,4-trimethyl-tetrahydroquinoline, N-γ-phenylpropyl-2,2,4-trimethyl-tetrahydroquinoline, N-β-chloroethyl-2,2,4-trimethyl-tetrahydroquinoline, N-β-bromoethyl-2,2,4-trimethyltetrahydroquinoline, N-β-hydroxyethyl-2,2,4-trimethyl-tetrahydroquinoline, N-β-cyanoethyl-2,2,4-trimethyl-tetrahydroquinoline, N-β-amidocarbonylethyl-2,2,4-trimethyl-tetrahydroquinoline, N-β-methoxycarbonyloxyethyl-2,2,4-trimethyl-tetrahydroquinoline, N-β-ethoxycarbonylethyl-2,2,4-trimethyl-tetrahydroquinoline, N-β-dimethylaminoethyl-2,2,4-trimethyl-tetrahydroquinoline, N-β-methoxyethyl-2,2,4-trimethyl-tetrahydroquinoline, N-β-acetoxyethyl-2,2,4-trimethyl-tetrahydroquinoline, N-β-hydroxy-n-propyl-2,2,4-trimethyl-tetrahydroquinoline, N-β-hydroxy-n-butyl-2,2,4-trimethyl-tetrahydroquinoline, N-β-hydroxy-i-butyl-2,2,4-trimethyl-tetrahydroquinoline, N-β-hydroxy-i-butyl-2,2,4-trimethyl-tetrahydroquinoline, N-cyclohexyl-2,2,4-trimethyl-tetrahydroquinoline, N-β-hydroxy-γ-methoxy-propyl-2,2,4-trimethyl-tetrahydroquinoline, N-β-hydroxy-γ-ethoxy-propyl-2,2,4-trimethyl-tetrahydroquinoline, N-β-hydroxy-γ-propoxy-propyl-2,2,4-trimethyl-tetrahydroquinoline, N-β-hydroxy-γ-butoxy-propyl-2,2,4- trimethyl-tetrahydroquinoline, N-β-hydroxy-γ-allyloxy-propyl-2,2,4-trimethyl-tetrahydroquinoline, N-β-hydroxy-γ-phenoxy-propyl-2,2,4-trimethyl-tetrahydroquinoline, N-β-hydroxy-β-phenyl-ethyl-2,2,4-trimethyl-tetrahydroquinoline, N-β-n-amyloxy-ethyl-2,2,4-trimethyl-tetrahydroquinoline, N-β-n-butoxy-ethyl-2,2,4-trimethyltetrahydroquinoline, N-β-t-butoxy-ethyl-2,2,4-trimethyl-tetrahydroquinoline, N-β-cyclohexyloxy-ethyl-2,2,4-trimethyl-tetrahydroquinoline, N-β-benzoyloxy-ethyl-2,2,4-trimethyl-tetrahydroquinoline, N-β-(p-methoxybenzoyloxy)-ethyl-2,2,4-trimethyltetrahydroquinoline, N-β-(p-methoxycarbonylbenzoyloxy)-ethyl-2,2,4-trimethyl-tetrahydroquinoline, N-β-phenoxy-ethyl-2,2,4-trimethyl-tetrahydroquinoline, N-β-benzyloxy-ethyl-2,2,4-trimethyl-tetrahydroquinoline, N-β-(β'-phenylethyloxy)-ethyl-2,2,4-trimethyl-tetrahydroquinoline, Nβ-(γ'-phenylpropoxy)-ethyl-2,2,4-trimethyl-tetrahydroquinoline, N-β-(β'-phenoxyethyloxy)-ethyl-2,2,4-trimethyl-tetrahydroquinoline, N-β-(p-chlorophenoxy)-ethyl-2,2,4-trimethyl-tetrahydroquinoline, N-β-(p-chlorobenzyloxy)-ethyl-2,2,4-trimethyl-tetrahydroquinoline, N-β-(o-chlorophenoxy)-ethyl-2,2,4-trimethyl-tetrahydroquinoline, N-β-(p-methylphenoxy)-ethyl-2,2,4-trimethyl-tetrahydroquinoline, N-β-(o-methylphenoxy)-ethyl-2,2,4-trimethyl-tetrahydroquinoline, N-β-(p-ethylphenoxy)-ethyl-2,2,4-trimethyl-tetrahydroquinoline, N-β-(o-ethylphenoxy)-ethyl-2,2,4-trimethyl-tetrahydroquinoline, N-β-(m-methylphenoxy)-ethyl-2,2,4-trimethyltetrahydroquinoline, N-β-(p-cyclohexylphenoxy)-ethyl-2,2,4-trimethyl-tetrahydroquinoline, N-β-(β'-naphthoxy)-ethyl-2,2,4-trimethyltetrahydroquinoline, N-β-(o-isopropoxyphenoxy)-ethyl-2,2,4-trimethyltetrahydroquinoline, N-β-(o,p-dichlorophenoxy)-ethyl-2,2,4-trimethyltetrahydroquinoline, N-β-(p-phenylphenoxy)-ethyl-2,2,4-trimethyl-tetrahydroquinoline, N-β-(o-benzylphenoxy)-ethyl-2,2,4-trimethyltetrahydroquinoline, N-β-(p-benzylphenoxy)-ethyl-2,2,4-trimethyltetrahydroquinoline, N-β-(p-tert.-butylphenoxy)-ethyl-2,2,4-trimethyltetrahydroquinoline, N-β-phenylthio-ethyl-2,2,4,-trimethyltetrahydroquinoline, N-β-(p-methoxyphenoxy)-ethyl-2,2,4-trimethyltetrahydroquinoline, N-β-(o-isopropyl-phenoxy)-ethyl-2,2,4-trimethyltetrahydroquinoline, N-β-(1,2,3,4,-tetrahydronaphth-(6)-oxy)-ethyl-2,2,4-trimethyltetrahydroquinoline, N-β-(1,2,3,4-tetrahydronaphth-(1)-oxy)-ethyl-2,2,4-trimethyltetrahydroquinoline, N-β-(phenylaminocarbonyloxy)-ethyl-2,2,4-trimethyltetrahydroquinoline, N-γ-phenoxypropyl-2,2,4-trimethyltetrahydroquinoline, N-δ-phenoxybutyl-2,2,4-trimethyltetrahydroquinoline, N-β-chloroethyl-2,2,4,8-tetramethyl-tetrahydroquinoline, 2,2,4,8-tetramethyl-tetrahydroquinoline, N-butyl-2,2,4,8-tetramethyl-tetrahydroquinoline, N-β-hydroxyethyl-2,2,4-trimethyl-8-ethyl-tetrahydroquinoline, N-β-hydroxyethyl-2,2,4-trimethyl-8-methoxy-tetrahydroquinoline, N-β-hydroxyethyl-2,2,4-trimethyl-8-ethoxy-tetrahydroquinoline, N-butyl-2,2,4-trimethyl-8-ethoxy-tetrahydroquinoline, N-butyl-2,2,4-trimethyl-8-ethyl-tetrahydroquinoline, N-butyl-2,2,4-trimethyl-8-methoxy-tetrahydroquinoline, 2,2,4-trimethyl-8-methoxy-tetrahydroquinoline, 2,2,4-trimethyl-8-ethoxy-tetrahydroquinoline, 2,2,4-trimethyl-8-ethyl-tetrahydroquinoline, 2,2,4-trimethyl-7,8-benzo-tetrahydroquinoline, mixture of N-β-hydroxyethyl-2,2,4,5-tetramethyl-tetrahydroquinoline and N-β-hydroxyethyl-2,2,4,7-tetramethyl-tetrahydroquinoline, mixture of 2,2,4,5-tetramethyl-tetrahydroquinoline and 2,2,4,7-tetramethyl-tetrahydroquinoline, mixture of 2,2,4-trimethyl-5-methoxy-tetrahydroquinoline and 2,2,4-trimethyl-7-methoxy-tetrahydroquinoline, mixture of 2,2,4-trimethyl-5-ethoxy-tetrahydroquinoline and 2,2,4,-trimethyl-7-ethoxy-tetrahydroquinoline, mixture of 2,2,4-trimethyl-5-chloro-tetrahydroquinoline and 2,2,4-trimethyl-7-chloro-tetrahydroquinoline, mixture of N-β-hydroxyethyl-2,2,4-trimethyl-5-methoxy-tetrahydroquinoline and N-β-hydroxyethyl-2,2,4-trimethyl-7-methoxy-tetrahydroquinoline, mixture of N-β-hydroxyethyl-2,2,4-trimethyl-5-ethoxy-tetrahydroquinoline and N-β-hydroxyethyl-2,2,4-trimethyl-7-ethoxy-tetrahydroquinoline, mixture of N-β-hydroxyethyl-2,2,4-trimethyl-5-chloro-tetrahydroquinoline and N-β-hydroxyethyl-2,2,4-trimethyl-7-chloro-tetrahydroquinoline, 2,2,4-trimethyl-5,8-dimethyl-tetrahydroquinoline, 2,2,4-trimethyl-5,8-dimethoxy-tetrahydroquinoline, 2,2,4-trimethyl-5,8-diethoxy-tetrahydroquinoline, N-β-hydroxy-2,2,4-trimethyl-5,8-dimethoxy-tetrahydroquinoline, N-β-chloroethyl-2,2,4-trimethyl-5,8-diethoxy-tetrahydroquinoline, N-β-(methylsulphonylamino)-ethyl-2,2,4-trimethyl-tetrahydroquinoline, N-β-γ-dichloropropyl-2,2,4-trimethyl-8-methoxy-tetrahydroquinoline, N-β-γ-dihydroxypropyl-2,2,4-trimethyl-8-ethoxy-tetrahydroquinoline, N-β-chloropropyl-2,2,4-trimethyl-8-ethoxy-tetrahydroquinoline, N-β-chloropropyl-2,2,4-trimethyl-8-methoxy-tetrahydroquinoline, N-β-hydroxybutyl-2,2,4-trimethyl-8-methoxy-tetrahydroquinoline, N-β-hydroxybutyl-2,2,4-trimethyl-8-ethoxy-tetrahydroquinoline, N-β-hydroxy-γ-chloropropyl-2,2,4-trimethyl-tetrahydroquinoline, N-β-(N'-methylsulphonyl-N'-methylamino)-ethyl-2,2,4-trimethyl-tetrahydroquinoline and N-β-(N'-methylsulphonyl-N'-ethylamino)-ethyl-2,2,4-trimethyl-tetrahydroquinoline.

The new dyestuffs are suitable for dyeing, printing and bulk dyeing of materials containing acid groups, above all of products which consist entirely or predominantly of polymerised unsaturated nitriles such as acrylonitrile and vinylidene dicyanide or of acid-modified polyesters or of acid-modified polyamides. They are furthermore suitable for the other known applications of cationic dyestuffs, such as dyeing and printing cellulose acetate, coir, jute, sisal and silk, tannin-treated cotton and paper, the production of ball-pen pastes and rubber-stamp inks, and use in flexographic printing. The dyeings and prints on the first-mentioned materials, especially on polyacrylonitrile are distinguished by their very high level of fastness, above all by very good fastness to light, wet processing, rubbing, decatising, sublimation and perspiration. The dyestuffs can be employed individually or as mixtures.

The dyestuffs according to the invention and their mixtures are very suitable for dyeing shaped articles consisting of polymerisation or copolymers of acrylonitrile, asymmetrical dicyanoethylene and acid-modified aromatic polyesters in chlorinated hydrocarbons as the dyebath, especially if they carry substituents which assist the solubility in chlorinated hydrocarbons, such as, for example, the tertiary butyl group of the dodecyl group, or if the anion An⁻ is the anion of a monobasic organic acid with 30 carbon atoms.

The parts indicated in the examples are parts by weight.

EXAMPLE 1

9.2 parts of 4-bromo-N-ethylnaphtholactam and 8 parts of N-β-chloroethyl-2,2,4-trimethyltetrahydroquinoline are stirred with 20 parts of phosphorus oxychloride and 6 parts of phosphorus pentoxide are then introduced whilst stirring. The mixture is gradually heated to 95° C and is then kept at this temperature for 2 hours. It is then stirred into 400 parts of water, 20 parts of sodium chloride are added and the dyestuff is separated from the solution after stirring for several hours. It is recrystallised from 500 parts of water with addition of 1 part of active charcoal. After precipitation with sodium chloride, it crystallises as the salt of the formula

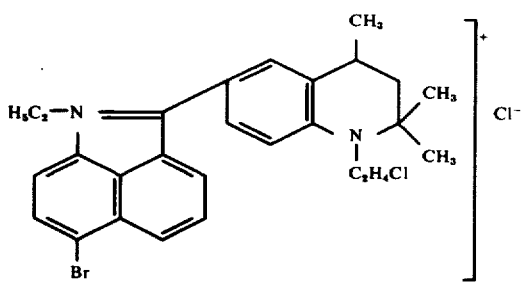

This dyestuff gives clear blue dyeings, distinguished by very good fastness properties, on materials of polyacrylonitrile, acid-modified polyesters and acid-modified polyamides. The same dyestuff is also obtained if instead of N-β-chloroethyl-2,2,4-trimethyltetrahydroquinoline the equivalent amount of N-β-hydroxyethyl-2,2,4-trimethyltetrahydroquinoline is employed.

If, in the process of preparation described above, the naphtholactam derivative used was replaced by the equivalent amount of N-methyl-, N-iso-propyl-, N-n-propyl-, N-n-butyl-, N-n-amyl-, N-cyclohexyl- or N-β-cyanoethyl-4-bromo-(or 4-chloro-)naphtholactam-(1,8), N-ethyl-4-chloronaphtholactam-(1,8) or N-methyl-, N-iso-propyl-, N-n-propyl-, N-n-butyl-, N-β-phenylethyl, N-β-chloroethyl- or N-β-cyanoethyl-naphtholactam-(1,8) and N-β-aminocarbonylethyl-naphtholactam-(1,8), N-ethoxycarbonyl-methyl-, N-allyl-, N-phenyl-, N-benzyl- or N-4'-methoxycarbonylbenzylnaphtholactam-(1,8) or N,2-trimethylene-naphtholactam or its 4-chloro- or 4-bromo- derivative, equivalent blue dyestuffs were obtained.

If on the other hand the process of preparation was carried out, instead of with N-β-chloroethyl-2,2,4-trimethyl-tetrahydroquinoline, with the equivalent amount of one of the tetrahydroquinolines mentioned in the table which follows, fast dyestuffs were again obtained, which dye polyacrylonitrile (PAC) in the colour shade which is also mentioned in the table.

| | Colour shade on PAC |
|---|---|
| N-Methyl-2,2,4-trimethyl-tetrahydroquinoline | blue |
| N-Ethyl-2,2,4-trimethyl-tetrahydroquinoline | blue |
| N-i-Propyl-2,2,4-trimethyl-tetrahydroquinoline | blue |
| N-n-Propyl-2,2,4-trimethyl-tetrahydroquinoline | blue |
| N-i-Butyl-2,2,4-trimethyl-tetrahydroquinoline | blue |
| N-n-Butyl-2,2,4-trimethyl-tetrahydroquinoline | blue |
| N-t-Butyl-2,2,4-trimethyl-tetrahydroquinoline | blue |
| N-i-Amyl-2,2,4-trimethyl-tetrahydroquinoline | blue |
| N-n-Amyl-2,2,4-trimethyl-tetrahydroquinoline | blue |
| N-n-Hexyl-2,2,4-trimethyl-tetrahydroquinoline | blue |
| N-Allyl-2,2,4-trimethyl-tetrahydroquinoline | blue |
| N-Benzyl-2,2,4-trimethyl-tetrahydroquinoline | blue |
| N-2'-Chloro-benzyl-2,2,4-trimethyl-tetrahydroquinoline | blue |
| N-4'-Chloro-benzyl-2,2,4-trimethyl-tetrahydroquinoline | blue |
| N-4'-Methyl-benzyl-2,2,4-trimethyl-tetrahydroquinoline | blue |
| N-2'-Methyl-benzyl-2,2,4-trimethyl-tetrahydroquinoline | blue |
| N-4'-Methoxy-benzyl-2,2,4-trimethyl-tetrahydroquinoline | blue |
| N-4'-Ethoxy-benzyl-2,2,4-trimethyl-tetrahydroquinoline | blue |
| N-β-Phenylethyl-benzyl-2,2,4-trimethyl-tetrahydroquinoline | blue |
| N-γ-Phenylpropyl-benzyl-2,2,4-trimethyl-tetrahydroquinoline | blue |
| 2,2,4-Trimethyl-tetrahydroquinoline | blue |
| N-β-Bromoethyl-2,2,4-trimethyl-tetrahydroquinoline | blue |
| N-β-Amidocarbonylethyl-2,2,4-trimethyl-tetrahydroquinoline | blue |
| N-β-Methoxycarbonyloxyethyl-2,2,4-trimethyl-tetrahydroquinoline | blue |
| N-β-Ethoxycarbonylethyl-2,2,4-trimethyl-tetrahydroquinoline | blue |
| N-β-Dimethylaminoethyl-2,2,4-trimethyl-tetrahydroquinoline | blue |
| N-β-Methoxyethyl-2,2,4-trimethyl-tetrahydroquinoline | blue |
| N-β-Acetoxyethyl-2,2,4-trimethyl-tetrahydroquinoline | blue |
| N-β-Hydroxy-n-propyl-2,2,4-trimethyl-tetrahydroquinoline | blue |
| N-β-Hydroxy-n-butyl-2,2,4-trimethyl-tetrahydroquinoline | blue |
| N-β-Hydroxy-i-butyl-2,2,4-trimethyl-tetrahydroquinoline | blue |
| N-cyclohexyl-2,2,4-trimethyl-tetrahydroquinoline | blue |
| N-β-Hydroxy-γ-methoxy-propyl-2,2,4-trimethyl-tetrahydroquinoline | blue |
| N-β-Hydroxy-γ-ethoxy-propyl-2,2,4-trimethyl-tetrahydroquinoline | blue |
| N-β-Hydroxy-γ-propoxy-propyl-2,2,4-trimethyl-tetrahydroquinoline | blue |
| N-β-Hydroxy-γ-butoxy-propyl-2,2,4-trimethyl-tetrahydroquinoline | blue |
| N-β-Hydroxy-γ-allyloxy-propyl-2,2,4-trimethyl-tetrahydroquinoline | blue |
| N-β-Hydroxy-γ-phenoxy-propyl-2,2,4-trimethyl-tetrahydroquinoline | blue |
| N-β-Hydroxy-β-phenyl-ethyl-2,2,4-trimethyl-tetrahydroquinoline | blue |
| N-β-n-Amyloxy-ethyl-2,2,4-trimethyl-tetrahydroquinoline | blue |
| N-β-n-Butoxy-ethyl-2,2,4-trimethyl-tetrahydroquinoline | blue |
| N-β-t-Butoxy-ethyl-2,2,4-trimethyl-tetrahydroquinoline | blue |
| N-β-cyclohexyloxy-ethyl-2,2,4-trimethyl-tetrahydroquinoline | blue |
| N-β-Benzoyloxy-ethyl-2,2,4-trimethyl-tetrahydroquinoline | blue |
| N-β-(p-Methoxybenzoyloxy)-ethyl-2,2,4-trimethyl-tetrahydroquinoline | blue |
| N-β-(p-Methoxycarbonylbenzoyloxy)-ethyl-2,2,4-trimethyl-tetrahydroquinoline | blue |
| N-β-(o-Benzylphenoxy)-ethyl-2,2,4-trimethyl-tetrahydroquinoline | blue |
| N-β-(p-Benzylphenoxy)-2,2,4-trimethyl-tetrahydroquinoline | blue |
| N-β-(p-tert.-Butylphenoxy)-ethyl-2,2,4-trimethyl-tetrahydroquinoline | blue |
| N-βPhenylthio-ethyl-2,2,4-trimethyl-tetrahydroquinoline | blue |

-continued

| | Colour shade on PAC |
|---|---|
| N-β-(p-Methoxy-phenoxy)-ethyl-2,2,4-trimethyl-tetrahydroquinoline | blue |
| N-β-(o-Isopropyl-phenoxy)-ethyl-2,2,4-trimethyl-tetrahydroquinoline | blue |
| N-β-(1,2,3,4-Tetrahydronaphth-(6)-oxy)-ethyl-2,2,4-trimethyl-tetrahydroquinoline | blue |
| N-β-(1,2,3,4-Tetrahydronapth-(1)-oxy)-ethyl-2,2,4-trimethyl-tetrahydroquinoline | blue |
| N-β-(Phenylaminocarbonyloxy)-ethyl-2,2,4-trimethyl-tetrahydroquinoline | blue |
| N-γ-Phenoxypropyl-2,2,4-trimethyl-tetrahydroquinoline | blue |
| N-δ-Phenoxy-butyl-2,2,4-trimethyl-tetrahydroquinoline | blue |
| N-β-Chloroethyl-2,2,4,8-tetramethyl-tetrahydroquinoline | blue |
| 2,2,4,8-Tetramethyl-tetrahydroquinoline | blue |
| N-Butyl-2,2,4,8-tetramethyl-tetrahydroquinoline | blue |
| N-β-Hydroxyethyl-2,2,4-trimethyl-8-ethyl-tetrahydroquinoline | greenish-tinged blue |
| N-β-Hydroxyethyl-2,2,4-trimethyl-8-methoxy-tetrahydroquinoline | greenish-tinged blue |
| N-β-Hydroxyethyl-2,2,4-trimethyl-8-ethoxy-tetrahydroquinoline | greenish-tinged blue |
| N-Butyl-2,2,4-trimethyl-8-ethoxy-tetrahydroquinoline | greenish-tinged blue |
| N-Butyl-2,2,4-trimethyl-8-ethyl-tetrahydroquinoline | greenish-tinged blue |
| N-Butyl-2,2,4-trimethyl-8-methoxy-tetrahydroquinoline | greenish-tinged blue |
| 2,2,4-Trimethyl-8-methoxy-tetrahydroquinoline | blue |
| 2,2,4-Trimethyl-8-ethoxy-tetrahydroquinoline | blue |
| 2,2,4-Trimethyl-8-ethyl-tetrahydroquinoline | blue |
| 2,2,4-Trimethyl-7,8-benzo-tetrahydroquinoline | turquoise blue |
| N-β-(N'-Methylsulphonyl-N'-methylamino)-ethyl-2,2,4-trimethyl-tetrahydroquinoline | blue |
| N-β-(N'-Methylsulphonyl-N'-ethylamino)-ethyl-2,2,4-trimethyl-tetrahydroquinoline | blue |
| N-β-Phenoxy-ethyl-2,2,4-trimethyl-tetrahydroquinoline | greenish-tinged blue |
| N-β-Benzyloxy-ethyl-2,2,4-trimethyl-tetrahydroquinoline | greenish-tinged blue |
| N-β-(β'-Phenylethyloxy)-ethyl-2,2,4-trimethyl-tetrahydroquinoline | greenish-tinged blue |
| N-β-(γ'-Phenylpropoxy)-ethyl-2,2,4-trimethyl-tetrahydroquinoline | greenish-tinged blue |
| N-β-(β'-Phenyloxyethyloxy)-ethyl-2,2,4-trimethyl-tetrahydroquinoline | greenish-tinged blue |
| N-β-(p-Chlorophenoxy)-ethyl-2,2,4-trimethyl-tetrahydroquinoline | greenish-tinged blue |
| N-β-(p-Chlorobenzyloxy)-ethyl-2,2,4-trimethyl-tetrahydroquinoline | greenish-tinged blue |
| N-β-(o-Chlorophenoxy)-ethyl-2,2,4-trimethyl-tetrahydroquinoline | greenish-tinged blue |
| N-β-(p-Methylphenoxy)-ethyl-2,2,4-trimethyl-tetrahydroquinoline | greenish-tinged blue |
| N-β-(o-Methylphenoxy)-ethyl-2,2,4-trimethyl-tetrahydroquinoline | greenish-tinged blue |
| N-β-(p-Ethylphenoxy)-ethyl-2,2,4-trimethyl-tetrahydroquinoline | greenish-tinged blue |
| N-β-(o-Ethylphenoxy)-ethyl-2,2,4-trimethyl-tetrahydroquinoline | greenish-tinged blue |
| N-β-(m-Methylphenoxy)-ethyl-2,2,4-trimethyl-tetrahydroquinoline | greenish-tinged blue |
| N-β-(p-Cyclohexylphenoxy)-ethyl-2,2,4-trimethyl-tetrahydroquinoline | greenish-tinged blue |
| N-β-(β'-Naphthoxy)-ethyl-2,2,4-trimethyl-tetrahydroquinoline | greenish-tinged blue |
| N-β-(o-Isopropoxyphenoxy)-ethyl-2,2,4-trimethyl-tetrahydroquinoline | greenish-tinged blue |
| N-β-(o,p-Dichlorophenoxy)-ethyl-2,2,4-trimethyl-tetrahydroquinoline | greenish-tinged blue |
| N-β-(p-Phenylphenoxy)-ethyl-2,2,4-trimethyl-tetrahydroquinoline | greenish-tinged blue |
| Mixture of N-β-hydroxyethyl-2,2,4,5-tetramethyl-tetrahydroquinoline and N-β-hydroxyethyl-2,2,4,7-tetramethyl-tetrahydroquinoline | blue |
| Mixture of 2,2,4,5-tetramethyl-tetrahydroquinoline and 2,2,4,7-tetramethyl-tetrahydroquinoline | blue |
| Mixture of 2,2,4-trimethyl-5-methoxy-tetrahydroquinoline and 2,2,4-trimethyl-7-methoxy-tetrahydroquinoline | blue |
| Mixture of 2,2,4-trimethyl-5-ethoxy-tetrahydroquinoline and 2,2,4-trimethyl-7-ethoxy-tetrahydroquinoline | blue |
| Mixture of 2,2,4-trimethyl-5-chloro-tetrahydroquinoline and 2,2,4-trimethyl-7-chloro-tetrahydroquinoline | blue |
| Mixture of N-β-hydroxyethyl-2,2,4-trimethyl-5-methoxy-tetrahydroquinoline and N-β-hydroxyethyl-2,2,4-trimethyl-7-methoxy-tetrahydroquinoline | blue |
| Mixture of N-β-hydroxyethyl-2,2,4-trimethyl-5-ethoxy-tetrahydroquinoline and N-β-hydroxyethyl-2,2,4-trimethyl-7-ethoxy-tetrahydroquinoline | blue |
| Mixture of N-β-hydroxyethyl-2,2,4-trimethyl-5-chloro-tetrahydroquinoline and N-β-hydroxyethyl-2,2,4-trimethyl-7-chloro-tetrahydroquinoline | blue |
| 2,2,4-Trimethyl-5,8-dimethyl-tetrahydroquinoline | blue |
| 2,2,4-Trimethyl-5,8-dimethoxy-tetrahydroquinoline | blue |
| 2,2,4-Trimethyl-5,8-diethoxy-tetrahydroquinoline | blue |
| N-β-Hydroxy-2,2,4-trimethyl-5,8-dimethoxy-tetrahydroquinoline | greenish-tinged blue |
| N-β-Chloroethyl-2,2,4-trimethyl-5,8-diethoxy-tetrahydroquinoline | greenish-tinged blue |
| N-β-(Methylsulphonylamino)-ethyl-2,2,4-trimethyl-tetrahydroquinoline | blue |
| N-β-γ-Dichloropropyl-2,2,4-trimethyl-8-methoxy-tetrahydroquinoline | greenish-tinged blue |
| N-β-γ-Dihydroxypropyl-2,2,4-trimethyl-8-ethoxy-tetrahydroquinoline | greenish-tinged blue |
| N-β-Chloropropyl-2,2,4-trimethyl-8-ethoxy-tetrahydroquinoline | greenish-tinged blue |
| N-β-Chloropropyl-2,2,4-trimethyl-8-methoxy-tetrahydroquinoline | greenish-tinged blue |
| N-β-Hydroxybutyl-2,2,4-trimethyl-8-methoxy-tetrahydroquinoline | greenish-tinged blue |
| N-β-Hydroxybutyl-2,2,4-trimethyl-8-ethoxy-tetrahydroquinoline | greenish-tinged blue |
| N-β-Hydroxy-γ-chloropropyl-2,2,4-trimethyl-tetrahydroquinoline | blue |

Valuable dyestuffs are also obtained if instead of the starting products indicated in Example 1, the following naphtholactams and tetrahydroquinolines are reacted with one another, using an analogous procedure:

| Naphtholactam-(1,8) | 2,2,4-Trimethyl-tetrahydroquinoline | Colour shade on PAC |
|---|---|---|
| N-Ethyl-4-(dimethylsulphamidinyl)-naphtholactam-(1,8) | N-β-hydroxyethyl-2,2,4-trimethyl-tetrahydroquinoline | blue |
| N-Ethyl-4-(phenyl-methyl-sulphamidinyl)-naphtholactam-(1,8) | N-β-hydroxyethyl-2,2,4-trimethyl-tetrahydroquinoline | blue |
| N-Ethyl-4-chloro-naphtholactam-(1,8) | N-n-butyl-2,2,4-trimethyl-tetrahydroquinoline | blue |
| N-Ethyl-4-chloro-naphtholactam-(1,8) | N-benzyl-2,2,4-trimethyl-tetrahydroquinoline | blue |
| N-Ethyl-4-chloro-naphtholactam-(1,8) | N-β-hydroxypropyl-2,2,4-trimethyl-tetrahydroquinoline | blue |
| N-Ethyl-2,4-dibromo-naphtholactam-(1,8) | N-n-butyl-2,2,4-trimethyl-tetrahydroquinoline | blue |
| N-Ethyl-4-chloro-naphtholactam-(1,8) | 2,2,4-trimethyl-tetrahydroquinoline | blue |
| N-Ethyl-4-(dimethylsulphamidinyl)-naphtholactam-(1,8) | N-n-butyl-2,2,4-trimethyltetrahydroquinoline | blue |
| N-Ethyl-4-chloro-naphtholactam-(1,8) | N-β-hydroxy-chloropropyl-2,2,4-trimethyl-tetrahydroquinoline | blue |
| N-Ethyl-2,4-dibromo-naphtholactam-(1,8) | N-β-hydroxypropyl-2,2,4-trimethyl-tetrahydroquinoline | blue |
| N-Ethyl-4-chloro-naphtholactam-(1,8) | N-β-hydroxybutyl-2,2,4-trimethyl-tetrahydroquinoline | blue |
| N-Ethyl-2,4-dibromo-naphtholactam-(1,8) | N-β-hydroxybutyl-2,2,4-trimethyl-tetrahydroquinoline | blue |
| N-Methyl-4-bromo-naphtholactam-(1,8) | N-β-hydroxypropyl-2,2,4-trimethyl-tetrahydroquinoline | blue |
| N-Methyl-4-bromo-naphtholactam-(1,8) | N-n-butyl-2,2,4-trimethyl-tetrahydroquinoline | blue |
| N-Methyl-4-bromo-naphtholactam-(1,8) | 2,2,4-trimethyl-tetrahydroquinoline | blue |
| N-Methyl-naphtholactam-(1,8) | N-n-butyl-2,2,4-trimethyl-tetrahydroquinoline | blue |
| N-Methyl-naphtholactam-(1,8) | N-β-hydroxypropyl-2,2,4-trimethyl-tetrahydroquinoline | blue |
| N-Methyl-naphtholactam-(1,8) | N-β-hydroxyethyl-2,2,4-trimethyl-tetrahydroquinoline | blue |
| N-Methyl-naphtholactam-(1,8) | N-benzyl-2,2,4-trimethyl-tetrahydroquinoline | blue |
| N-Methyl-naphtholactam-(1,8) | N-β-hydroxy-γ-chloropropyl-2,2,4-trimethyl-tetrahydroquinoline | blue |
| N-Methyl-naphtholactam-(1,8) | N-β-hydroxybutyl-2,2,4-trimethyl-tetrahydroquinoline | blue |
| N-Methyl-4-bromo-naphtholactam-(1,8) | N-β-hydroxyethyl-2,2,4-trimethyl-tetrahydroquinoline | blue |
| N-Methyl-4-bromo-naphtholactam-(1,8) | N-β-hydroxybutyl-2,2,4-trimethyl-tetrahydroquinoline | blue |
| N-Methyl-4-bromo-naphtholactam-(1,8) | N-benzyl-2,2,4-trimethyl-tetrahydroquinoline | blue |
| N-Methyl-4-bromo-naphtholactam-(1,8) | N-β-hydroxy-γ-chloropropyl-2,2,4-trimethyl-tetrahydroquinoline | blue |
| N-Ethyl-2,4-dibromo-naphtholactam-(1,8) | 2,2,4-trimethyl-tetrahydroquinoline | blue |
| N-β-Cyanoethyl-naphtholactam-(1,8) | N-ethyl-2,2,4-trimethyl-tetrahydroquinoline | blue |
| N-β-Chloroethyl-naphtholactam-(1,8) | N-ethyl-2,2,4-trimethyl-tetrahydroquinoline | blue |
| N-β-Aminocarbonylethyl-naphtholactam-(1,8) | N-ethyl-2,2,4-trimethyl-tetrahydroquinoline | blue |

EXAMPLE 2

9 parts of N-ethyl-naphtholactam-(1,8) and 10.7 parts of N-n-butyl-2,2,4-trimethyltetrahydroquinoline are stirred with 20 parts of phosphorus oxychloride and 6 parts of phosphorus pentoxide are then introduced whilst stirring. The mixture is gradually heated to 85° C and is kept at this temperature for 2 hours. It is then stirred into 400 parts of water, 100 parts of sodium chloride are added and after stirring for several hours the dyestuff is separated from the solution. It is recrystallised from 300 parts of water with addition of 1 part of active charcoal, and is then precipitated with sodium chloride. The product corresponds to the formula

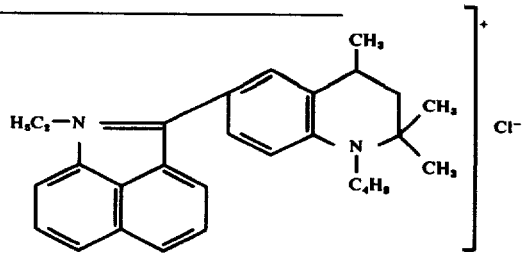

This dyestuff gives clear blue dyeings, distinguished by very good fastness properties, on materials of acid-modified polyesters, polyacrylonitrile or acid-modified polyamides.

If, in the process of preparation described above, the N-butyl-2,2,4-trimethyltetrahydroquinoline was replaced by the equivalent amount of one of the tetrahydroquinolines indicated in the table which follows, equivalent dyestuffs were obtained, which dye polyacrylonitrile in the colour shade which is also indicated in the table.

| | |
|---|---|
| N-Methyl-2,2,4-trimethyl-tetrahydroquinoline | blue |
| N-Ethyl-2,2,4-trimethyl-tetrahydroquinoline | blue |
| N-i-Propyl-2,2,4-trimethyl-tetrahydroquinoline | blue |

| | |
|---|---|
| N-n-Propyl-2,2,4-trimethyl-tetrahydroquinoline | blue |
| N-i-Butyl-2,2,4-trimethyl-tetrahydroquinoline | blue |
| N-t-Butyl-2,2,4-trimethyl-tetrahydroquinoline | blue |
| N-i-Amyl-2,2,4-trimethyl-tetrahydroquinoline | blue |
| N-n-Amyl-2,2,4-trimethyl-tetrahydroquinoline | blue |
| N-n-Hexyl-2,2,4-trimethyl-tetrahydroquinoline | blue |
| N-Allyl-2,2,4-trimethyl-tetrahydroquinoline | blue |
| N-Benzyl-2,2,4-trimethyl-tetrahydroquinoline | blue |
| N-2'-Chloro-benzyl-2,2,4-trimethyl-tetrahydroquinoline | blue |
| N-4'-Chloro-benzyl-2,2,4-trimethyl-tetrahydroquinoline | blue |
| N-4'-Methyl-benzyl-2,2,4-trimethyl-tetrahydroquinoline | blue |
| N-2'-Methyl-benzyl-2,2,4-trimethyl-tetrahydroquinoline | blue |
| N-4'-Methoxy-benzyl-2,2,4-trimethyl-tetrahydroquinoline | blue |
| N-4'-Ethoxy-benzyl-2,2,4-trimethyl-tetrahydroquinoline | blue |
| N-β-Phenylethyl-benzyl-2,2,4-trimethyl-tetrahydroquinoline | blue |
| N-γ-Phenylpropyl-benzyl-2,2,4-trimethyl-tetrahydroquinoline | blue |
| 2,2,4-Trimethyl-tetrahydroquinoline | reddish-tinged blue |
| N-β-Chloroethyl-2,2,4-trimethyl-tetrahydroquinoline | reddish-tinged blue |
| N-β-Bromoethyl-2,2,4-trimethyl-tetrahydroquinoline | reddish-tinged blue |
| N-β-Hydroxyethyl-2,2,4-trimethyl-tetrahydroquinoline | reddish-tinged blue |
| N-β-Amidocarbonylethyl-2,2,4-trimethyl-tetrahydroquinoline | reddish-tinged blue |
| N-β-Methoxycarbonyloxyethyl-2,2,4-trimethyl-tetrahydroquinoline | reddish-tinged blue |
| N-β-Ethoxycarbonylethyl-2,2,4-trimethyl-tetrahydroquinoline | reddish-tinged blue |
| N-β-Dimethylaminoethyl-2,2,4-trimethyl-tetrahydroquinoline | blue |
| N-β-Methoxyethyl-2,2,4-trimethyl-tetrahydroquinoline | reddish-tinged blue |
| N-β-Acetoxyethyl-2,2,4-trimethyl-tetrahydroquinoline | reddish-tinged blue |
| N-β-Hydroxy-n-propyl-2,2,4-trimethyl-tetrahydroquinoline | reddish-tinged blue |
| N-β-Hydroxy-n-butyl-2,2,4-trimethyl-tetrahydroquinoline | reddish-tinged blue |
| N-β-Hydroxy-i-butyl-2,2,4-trimethyl-tetrahydroquinoline | reddish-tinged blue |
| N-Cyclohexyl-2,2,4-trimethyl-tetrahydroquinoline | blue |
| N-β-Hydroxy-γ-methoxy-propyl-2,2,4-trimethyl-tetrahydroquinoline | reddish-tinged blue |
| N-β-Hydroxy-γ-ethoxy-propyl-2,2,4-trimethyl-tetrahydroquinoline | reddish-tinged blue |
| N-β-Hydroxy-γ-propoxy-propyl-2,2,4-trimethyl-tetrahydroquinoline | reddish-tinged blue |
| N-β-Hydroxy-γ-butoxy-propyl-2,2,4-trimethyl-tetrahydroquinoline | reddish-tinged blue |
| N-β-Hydroxy-γ-allyloxy-propyl-2,2,4-trimethyl-tetrahydroquinoline | reddish-tinged blue |
| N-β-Hydroxy-γ-phenoxy-propyl-2,2,4-trimethyl-tetrahydroquinoline | blue |
| N-β-Hydroxy-β-phenyl-ethyl-2,2,4-trimethyl-tetrahydroquinoline | blue |
| N-β-n-Amyloxy-ethyl-2,2,4-trimethyl-tetrahydroquinoline | reddish-tinged blue |
| N-β-n-Butoxy-ethyl-2,2,4-trimethyl-tetrahydroquinoline | reddish-tinged blue |
| N-β-t-Butoxy-ethyl-2,2,4-trimethyl-tetrahydroquinoline | blue |
| N-β-Cyclohexyloxy-ethyl-2,2,4-trimethyl-tetrahydroquinoline | blue |
| N-β-Benzoyloxy-ethyl-2,2,4-trimethyl-tetrahydroquinoline | blue |
| N-β-(p-Methoxybenzoyloxy)-ethyl-2,2,4-trimethyl-tetrahydroquinoline | blue |
| N-β-(p-Methoxycarbonylbenzoyloxy)-ethyl-2,2,4-trimethyl-tetrahydroquinoline | blue |
| N-β-(o-Benzylphenoxy)-ethyl-2,2,4-trimethyl-tetrahydroquinone | blue |
| N-β-(p-Benzylphenoxy)-2,2,4-trimethyl-tetrahydroquinoline | blue |
| N-β-(p-tert.-Butylphenoxy)-ethyl-2,2,4-trimethyl-tetrahydroquinoline | blue |
| N-β-Phenylthio-ethyl-2,2,4-trimethyl-tetrahydroquinoline | blue |
| N-β-(p-Methoxy-phenoxy)-ethyl-2,2,4-trimethyl-tetrahydroquinoline | blue |
| N-β-(o-Isopropyl-phenoxy)-ethyl-2,2,4-trimethyl-tetrahydroquinoline | blue |
| N-β-(1,2,3,4-Tetrahydronaphth-(6)-oxy)-ethyl-2,2,4-trimethyl-tetrahydroquinoline | blue |
| N-β-(1,2,3,4-Tetrahydronaphth-(1)-oxy)-ethyl-2,2,4-trimethyl-tetrahydroquinoline | blue |
| N-β-(Phenylaminocarbonyloxy)-ethyl-2,2,4-trimethyl-tetrahydroquinoline | blue |
| N-γ-Phenoxypropyl-2,2,4-trimethyl-tetrahydroquinoline | blue |
| N-δPhenoxy-butyl-2,2,4-trimethyl-tetrahydroquinoline | blue |
| N-β-Chloroethyl-2,2,4,8-tetramethyl-tetrahydroquinoline | blue |
| 2,2,4,8-Tetramethyl-tetrahydroquinoline | blue |
| N-Butyl-2,2,4,8-tetramethyl-tetrahydroquinoline | blue |
| N-β-Hydroxyethyl-2,2,4-trimethyl-8-ethyl-tetrahydroquinoline | blue |
| N-β-Hydroxyethyl-2,2,4-trimethyl-8-methoxy-tetrahydroquinoline | blue |
| N-β-Hydroxyethyl-2,2,4-trimethyl-8-ethoxy-tetrahydroquinoline | blue |
| N-Butyl-2,2,4-trimethyl-8-ethoxy-tetrahydroquinoline | blue |
| N-Butyl-2,2,4-trimethyl-8-ethyl-tetrahydroquinoline | blue |
| N-Butyl-2,2,4-trimethyl-8-methoxy-tetrahydroquinoline | blue |
| 2,2,4-Trimethyl-8-methoxy-tetrahydroquinoline | blue |
| 2,2,4-Trimethyl-8-ethoxy-tetrahydroquinoline | blue |
| 2,2,4-Trimethyl-8-ethyl-tetrahydroquinoline | blue |
| 2,2,4-Trimethyl-7,8-benzo-tetrahydroquinoline | blue |
| N-β-(N'-Methylsulphonyl-N'-methylamino)-ethyl-2,2,4-trimethyl-tetrahydroquinoline | blue |
| N-β-(N'-Methylsulphonyl-N'-ethylamino)-ethyl-2,2,4-trimethyl-tetrahydroquinoline | blue |
| N-β-Phenoxy-ethyl-2,2,4-trimethyl-tetrahydroquinoline | blue |
| N-β-Benzyloxy-ethyl-2,2,4-trimethyl-tetrahydroquinoline | blue |
| N-β-(β'-Phenylethyloxy)-ethyl-2,2,4-trimethyl-tetrahydroquinoline | blue |
| N-β-(β'-Phenylpropoxy)-ethyl-2,2,4-trimethyl-tetrahydroquinoline | blue |
| N-β-(β'-Phenyloxyethyloxy)-ethyl-2,2,4-trimethyl-tetrahydroquinoline | blue |
| N-β-(p-Chlorophenoxy)-ethyl-2,2,4-trimethyl-tetrahydroquinoline | blue |
| N-β-(p-Chlorobenzyloxy)-ethyl-2,2,4-trimethyl-tetrahydroquinoline | blue |
| N-β-(o-Chlorophenoxy)-ethyl-2,2,4-trimethyl-tetrahydroquinoline | blue |
| N-β-(p-Methylphenoxy)-ethyl-2,2,4-trimethyl-tetrahydroquinoline | blue |
| N-β-(o-Methylphenoxy)-ethyl-2,2,4-trimethyl-tetrahydroquinoline | blue |
| N-β-(p-Ethylphenoxy)-ethyl-2,2,4-trimethyl-tetrahydroquinoline | blue |
| N-β-(o-Ethylphenoxy)-ethyl-2,2,4-trimethyl-tetrahydroquinoline | blue |
| N-β-(m-Methylphenoxy)-ethyl-2,2,4-trimethyl-tetrahydroquinoline | blue |
| N-β-(p-Cyclohexylphenoxy)-ethyl-2,2,4-trimethyl-tetrahydroquinoline | blue |
| N-β-(β'-Naphthoxy)-ethyl-2,2,4-trimethyl-tetrahydroquinoline | blue |
| N-β-(o-Isopropoxyphenoxy)-ethyl-2,2,4-trimethyl-tetrahydroquinoline | blue |
| N-β-(o,p-Dichlorophenoxy)-ethyl-2,2,4-trimethyl-tetrahydroquinoline | blue |
| N-β-(p-Phenylphenoxy)-ethyl-2,2,4-trimethyl-tetrahydroquinoline | blue |
| Mixture of N-β-hydroxyethyl-2,2,4,5-tetramethyl-tetrahydroquinoline and N-β-hydroxyethyl-2,2,4,7-tetramethyl-tetrahydroquinoline Mixture of | reddish-tinged blue |

| | |
|---|---|
| 2,2,4,5-tetramethyl-tetrahydroquinoline and 2,2,4,7-tetramethyl-tetrahydroquinoline | reddish-tinged blue |
| Mixture of 2,2,4-trimethyl-5-methoxy-tetrahydroquinoline and 2,2,4-trimethyl-7-methoxy-tetrahydroquinoline | reddish-tinged blue |
| Mixture of 2,2,4-trimethyl-5-ethoxy-tetrahydroquinoline and 2,2,4-trimethyl-7-ethoxy-tetrahydroquinoline | reddish-tinged blue |
| Mixture of 2,2,4-trimethyl-5-chloro-tetrahydroquinoline and 2,2,4-trimethyl-7-chloro-tetrahydroquinoline | reddish-tinged blue |
| Mixture of N-β-hydroxyethyl-2,2,4-trimethyl-5-methoxy-tetrahydroquinoline and N-β-hydroxyethyl-2,2,4-trimethyl-7-methoxy-tetrahydroquinoline | blue |
| Mixture of N-β-hydroxyethyl-2,2,4-trimethyl-5-ethoxy-tetrahydroquinoline and N-β-hydroxyethyl-2,2,4-trimethyl-7-ethoxy-tetrahydroquinoline | blue |
| Mixture of N-β-hydroxyethyl-2,2,4-trimethyl-5-chloro-tetrahydroquinoline and N-β-hydroxyethyl-2,2,4-trimethyl-7-chloro-tetrahydroquinoline | reddish-tinged blue |
| 2,2,4-Trimethyl-5,8-dimethyl-tetrahydroquinoline | reddish-tinged blue |
| 2,2,4-Trimethyl-5,8-dimethoxy-tetrahydroquinoline | reddish-tinged blue |
| 2,2,4-Trimethyl-5,8-diethoxy-tetrahydroquinoline | blue |
| N-β-Hydroxyethyl-2,2,4-trimethyl-5,8-dimethoxy-tetrahydroquinoline | blue |
| N-β-Chloroethyl-2,2,4-trimethyl-5,8-diethoxy-tetrahydroquinoline | blue |
| N-β-(Methylsulphonylamino)-ethyl-2,2,4-trimethyl-tetrahydroquinoline | reddish-tinged blue |
| N-β-δ-Dichloropropyl-2,2,4-trimethyl-8-methoxy-tetrahydroquinoline | blue |
| N-β-γ-Dihydroxypropyl-2,2,4-trimethyl-8-ethoxy-tetrahydroquinoline | blue |
| N-β-Chloropropyl-2,2,4-trimethyl-8-ethoxy-tetrahydroquinoline | blue |
| N-β-Chloropropyl-2,2,4-trimethyl-8-methoxy-tetrahydroquinoline | blue |
| N-β-Hydroxybutyl-2,2,4-trimethyl-8-methoxy-tetrahydroquinoline | blue |
| N-β-Hydroxybutyl-2,2,4-trimethyl-8-ethoxy-tetrahydroquinoline | blue |
| N-β-Hydroxy-γ-chloropropyl-2,2,4-trimethyl-tetrahydroquinoline | reddish-tinged blue |

EXAMPLE 3

A polyacrylonitrile fabric is printed with a printing paste which was prepared in the following manner: 30 parts of the dyestuff described in Example 1, 50 parts of thiodiethylene glycol, 30 parts of cyclohexanol and 30 parts of 30% strength acetic acid are covered with 330 parts of hot water and the resulting solution is added to 500 parts of crystal gum (gum arabic as thickener). Finally, 30 parts of zinc nitrate solution are also added. The resulting print is dried, steamed for 30 minutes and then rinsed. A blue print of very good fastness properties is obtained.

EXAMPLE 4

Acid-modified polyethylene glycol terephthalate fibres are introduced, in a liquor ratio of 1:40, into an aqueous bath at 20° C, which contains, per liter, 3 to 10 g of sodium sulphate, 0.1 to 1 g of oleyl polyglycol ether (50 mols of ethylene oxide per mol of oleyl alcohol), 0–15 g of dimethylbenzyldodecylammonium chloride and 0.15 g of the dyestuff described in Example 2 and which has been adjusted to pH 4 to 5 with acetic acid. The bath is heated to 100° C over the course of 30 minutes and is kept at this temperature for 60 minutes. The fibres are then rinsed and dried. A blue dyeing of very good fastness properties is obtained.

EXAMPLE 5

Polyacrylonitrile fibres are introduced, using a liquor ratio of 1:40, into an aqueous bath at 40° C, which contains, per liter, 0.75 g of 30% strength acetic acid, 0.38 g of sodium acetate and 0.15 g of the dyestuff described in Example 1. The bath is heated to the boil over the course of 20–30 minutes and kept at this temperature for 30–60 minutes. After rinsing and drying, a blue dyeing with very good fastness properties is obtained.

EXAMPLE 6

A stock solution is prepared from 15 parts by weight of the dyestuff mentioned in Example 1, 15 parts by weight of polyacrylonitrile and 70 parts by weight of dimethylformamide and is added to a customary polyacrylonitrile spinning solution, which is spun in the known manner. A blue dyeing of very good fastness properties is obtained.

EXAMPLE 7

Acid-modified synthetic polyamide fibres are introduced, using a liquor ratio of 1:40, into an aqueous bath at 40° C, which contains, per liter, 10 g of sodium acetate, 1 to 5 g of oleyl polyglycol ether (50 mols of ethylene oxide per mol of oleyl alcohol) and 0.3 g of the dyestuff described in Example 1 and which has been adjusted to pH 4–5 with acetic acid. The bath is heated to 98° C over the course of 30 minutes and is kept at this temperature. The fibres are then rinsed and dried. A blue dyeing is obtained.

I claim:
1. Cationic dyestuff of the formula

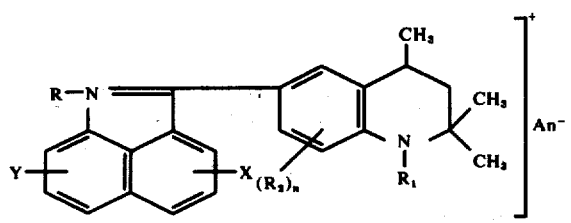

in which
R is $C_1$-$C_6$-alkyl mono-substituted with halogen, hydroxy, $C_1$-$C_4$-alkoxy, cyano, $C_1$-$C_4$-alkoxycarbonyl or aminocarbonyl; $C_2$-$C_7$-alkenyl or $C_2$-$C_7$-alkenyl mono-substituted with halogen; propargyl; phenylmethyl, phenylethyl, β-phenyl-β-hydroxy-ethyl, 2-phenylpropyl-(2) or the foregoing mono-substituted in the phenyl nucleus with $C_1$-$C_6$-alkyl or $C_1$-$C_6$-alkoxy; cyclopentyl; cyclohexyl; cyclopentyl or cyclohexyl mono-substituted with $C_1$-$C_6$-alkyl; phenyl; naphthyl; phenyl or naphthyl mono-substituted with halogen, $C_1$-$C_6$-alkyl or $C_1$-$C_6$-alkoxy; or trimethylene bonded to the naphthalene ring in the β position;

$R_1$ is hydrogen $C_1$-$C_6$-alkyl; $C_1$-$C_6$-alkyl mono-substituted with halogen, hydroxy, $C_1$-$C_4$-alkoxy, cyano, $C_1$-$C_4$-alkoxycarbonyl or aminocarbonyl; β,γ-dichloropropyl; $C_2$-$C_7$-alkenyl mono-substituted with halogen; propargyl; phenylmethyl, phenylethyl, β-phenyl-β-hydroxyethyl, 2-phenylpropyl-(2) or the foregoing mono-substituted in the phenyl nucleus with $C_1$-$C_6$-alkyl or $C_1$-$C_6$-alkoxy; cyclopentyl; cyclohexyl; or cyclopentyl or cyclohexyl mono-substituted with $C_1$-$C_6$-alkyl;

$R_2$ is hydrogen; halogen; $C_1$-$C_6$-alkyl; $C_1$-$C_6$-alkyl mono-substituted with halogen, hydroxy, $C_1$-$C_4$-alkoxy, cyano, $C_1$-$C_4$-alkoxycarbonyl or aminocarbonyl; $C_2$-$C_7$-alkenyl; $C_2$-$C_7$-alkenyl mono-substituted with halogen; propargyl; phenylmethyl, phenylethyl, β-phenyl-β-hydroxy-ethyl, 2-phenylpropyl-(2) or the foregoing mono-substituted in the phenyl nucleus with $C_1$-$C_6$-alkyl or $C_1$-$C_6$-alkoxy; $C_1$-$C_4$-alkoxy; hydroxyl; amino; or ($C_1$-$C_4$-alkyl)carbonylamino;

n is 0, 1, 2 or 3;
X is hydrogen; halogen or $C_1$-$C_6$-alkyl;
Y is hydrogen; halogen; $C_1$-$C_6$-alkyl; hydroxy; cyano; $C_1$-$C_4$-alkoxy; $C_1$-$C_4$-alkylmercapto; mono- or di-$C_1$-$C_4$-alkylamino; and
An⁻ is an anion.

2. Dyestuff according to claim 1 of the formula

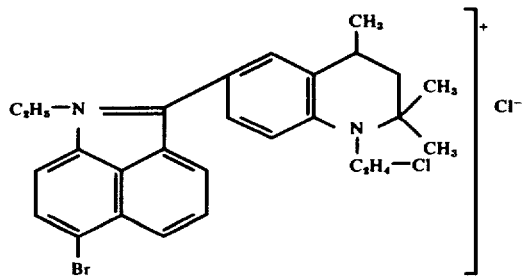

3. Dyestuff according to claim 1 of the formula

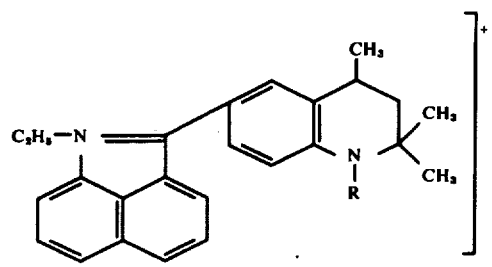

in which R is ethyl or n-butyl.

4. Cationic dyestuff of claim 1, wherein
$R_2$ is hydrogen, halogen, $C_1$-$C_6$-alkyl, $C_2$-$C_7$-alkenyl, propargyl, phenylmethyl, phenylethyl, β-phenyl-β-hydroxy-ethyl, 2-phenyl-propyl-(2), amino, mono- or di-$C_1$-$C_4$-alkyl-amino or $C_1$-$C_4$-alkylcarbonylamino; and
Y is hydrogen, halogen, hydroxyl, $C_1$-$C_4$-alkoxy, $C_1$-$C_6$-alkyl, $C_2$-$C_7$-alkenyl, propargyl, or amino.

5. Cationic dyestuff according to claim 4, wherein
R is $C_1$-$C_6$-alkyl; $C_1$-$C_6$-alkyl mono-substituted by halogen, hydroxy, $C_1$-$C_4$-alkoxy, cyano, $C_1$-$C_4$-alkoxycarbonyl or aminocarbonyl; $C_2$-$C_7$-alkenyl; $C_2$-$C_7$-alkenyl substituted by halogen; propargyl; cyclopentyl; cyclohexyl; or cyclopentyl or cyclohexyl substituted by $C_1$-$C_6$-alkyl.

6. Cationic dyestuff of claim 1 in which
An⁻ is a halide, methosulfate, ethosulfate, sulfate, benzenesulfonate, toluenesulfonate or acetate ion.

7. Cationic dyestuffs of the formula

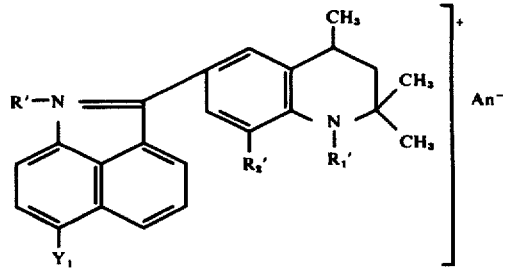

in which
R' represents an alkyl radical with 1–6 C atoms or an alkenyl radical with 2–6 C atoms,
$R_1'$ represents an alkyl radical with 1–6 C atoms, an alkenyl radical with 2–6 C atoms, a benzyl radical or a cyclohexyl radical,
$R_2'$ represents hydrogen or an alkyl or alkoxy radical with 1 to 4 C atoms,
$Y_1$ represents hydrogen, chlorine or bromine and An⁻ represents an anion.

8. Dyestuffs according to claim 7, characterised in that in these
R' represents a methyl, ethyl, n-propyl, n-butyl, β-cyanoethyl or β-chloroethyl group,
$R_1'$ represents methyl, ethyl, n- or iso-propyl, n- or iso-butyl, n- and iso-amyl, β-chloroethyl, β-chloropropyl, β,γ-dichloropropyl, β-hydroxycarbonylethyl, β-amidocarbonylethyl, β-cyanoethyl, β-methoxyethyl, β-phenoxyethyl, β-benzyloxyethyl, β-acetoxyethyl, benzyl, 4-chlorobenzyl, β-(4-chlorophenoxy)-ethyl, β-(4-methylphenoxy)- ethyl, 4-methylbenzyl, β-(4-methoxyphenoxy)-ethyl or 4-methoxybenzyl, and $R_2'$ represents hydrogen, methyl, ethyl, methoxy or ethoxy.
9. Cationic dyestuffs of the formula
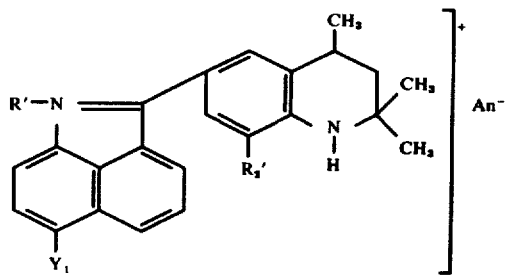
in which
$Y_1$, $R'$, $R_2'$ and $An^-$ have the meaning indicated in claim 7.